United States Patent [19]

Lam et al.

[11] Patent Number: 5,210,964
[45] Date of Patent: May 18, 1993

[54] SPOT MOUNDER METHOD AND APPARATUS

[75] Inventors: Samuel F. Lam; James A. Maxwell, both of Victoria; James M. Ewart, North Vancouver, all of Canada

[73] Assignee: The Province of British Columbia, Ministry of Forests, Victoria, Canada

[21] Appl. No.: 589,493

[22] Filed: Sep. 26, 1990

Related U.S. Application Data

[63] Continuation-in-part of Ser. No. 321,283, Mar. 9, 1989, abandoned.

[51] Int. Cl.[5] .......................... E02F 3/00; A01B 61/04
[52] U.S. Cl. .................................... 37/118 R; 37/195; 37/DIG. 1; 172/237; 172/260.5
[58] Field of Search ............. 37/80 R, 98, 103, 118 R, 37/195, 183 A, DIG. 1; 171/7; 172/12, 237, 260.5, 529

[56] References Cited

U.S. PATENT DOCUMENTS

| | | |
|---|---|---|
| 2,348,796 | 5/1944 | Ferwerda et al. |
| 2,713,219 | 7/1955 | Gerrans |
| 2,987,128 | 6/1961 | Krieg |
| 3,023,586 | 3/1962 | Morrison |
| 3,473,242 | 10/1969 | Martin |
| 3,618,670 | 11/1971 | Alberto |
| 3,949,497 | 4/1976 | Crump |
| 4,031,964 | 6/1977 | Takahashi et al. |
| 4,044,838 | 8/1977 | Wooldridge |
| 4,102,066 | 7/1978 | Christoff |
| 4,123,861 | 11/1978 | Hemphill |
| 4,142,308 | 3/1979 | Brandtjen |
| 4,213,502 | 7/1980 | Gibson |
| 4,249,614 | 2/1981 | van der Lely |
| 4,343,099 | 8/1982 | Ziegler et al. |
| 4,350,210 | 9/1982 | Shadden et al. |
| 4,805,322 | 2/1989 | Lemire et al. |

FOREIGN PATENT DOCUMENTS 135438 9/1979 German Democratic Rep. ................................. 172/260.5

OTHER PUBLICATIONS

Paul MacDonald, "Wanted: A scarifier producer", *British Columbia Lumberman*, Jun. 1985.
"New site preparation equipment tested near McBride", *Robson Valley Courier*, Oct. 16, 1985.
K. Z. Apt. et al., "Development And Testing Of A Spot Scarifier", Paper No. 79-1612, presented Dec. 1979 for the American Society of Agricultural Engineers.
M. A. Grismer et al., "An Evaluation of the Donar Mounding Scarifier (Sinkkila 2) and a 1985 Prototype TTS Mounder", Jan. 1986.
Forestry FRDA Report 006, "Trials of the Sinkkila HMF Scarifier in North Central British Columbia", dated Feb. 1987.
Soviet Inventions Illustrated Section P, Week 8427, Aug. 15, 1984, Derwent Publications Ltd., London GB, No. 84-170089/27 & SU-A-1050596 (Lengd. Forestry).

*Primary Examiner*—Dennis L. Taylor
*Assistant Examiner*—J. Russell McBee
*Attorney, Agent, or Firm*—John Russell Uren

[57] ABSTRACT

Method and apparatus for forming spot mounds used in assisting the germination and growth of tree seedlings in reforestation. A crawler moves forwardly while a digging blade connected to a frame is lowered into the soil in order to overturn the soil and form a mound. After the digging blade is lowered into the ground, the digging blade rotates so as to better form and thereafter pass the formed mound without interference.

9 Claims, 16 Drawing Sheets

| FIG. 4A | FIG. 4B | FIG. 4C |
| --- | --- | --- |
| FIG. 4D | FIG. 4E | FIG. 4F |

SPOT MOUNDER METHOD AND APPARATUS

CROSS-REFERENCE TO RELATED APPLICATION

This application is a continuation-in-part of co-pending U.S. patent application Ser. No. 07/321,283 filed Mar. 9, 1989 and now abandoned.

INTRODUCTION

This invention relates to a method and apparatus for constructing a mound from earth and, more particularly, to a method and apparatus for constructing a mound on which to plant tree seedlings.

BACKGROUND OF THE INVENTION

Reforestation is desirable for many reasons and is generally required by statute following the logging of forested areas. Such reforestation requires that seedlings be planted to provide forest regrowth for environmental and economic reasons.

The survival and subsequent growth rate of planted seedlings, however, is heavily dependent on the conditions under which such seedlings are planted and nurtured. If a reforestation site has poor drainage and cool soil temperatures, it is beneficial to provide the seedlings with better growing conditions such as enhanced drainage, warmer soil temperatures, increased access to nutrients and decreased competition from surrounding vegetation.

The use of mounds in which to plant seedlings is known to increase their growth rate. The method of construction of such mounds, however, is important. For example, it may be desirable to invert the "duff cover" which comprises the nitrogen rich litter, fermentation and humus soil layers of the forest floor so as to make the duff cover accessible for the sensitive seedling roots. The duff cover will be buried under the mineral soil covering which forms the top of the mound. The mineral soil will facilitate warming by the sun and generally lead to increased soil temperatures in the mound. If the depth of the mineral soil is sufficient, it also assists in controlling the growth of competing vegetation surrounding the seedling. The elevated planting position is beneficial on wet sites. A mineral soil mound, without inverted "duff cover", may be desirable on some sites, and can be created by removing the duff cover before mounding.

Previously, mounds have been machine constructed in a process called "spot mounding" using apparatuses called "spot mounders" but some such techniques have often been less than satisfactory. In one machine used for site preparation, for example, two sets of scarifying wheels are used which continuously rotate and which are attached to a frame pivotally attached to and towed behind a prime mover such as a tractor or crawler. A braking system slows the rotation of the scarifying wheels when it is desired to form the mounds used for seedling planting. While the device operates satisfactorily in some soil conditions, it does not operate well in all soil conditions. This is so because the scarifying wheels are not driven into the ground nor is the towed frame heavy enough to give the required depth to the digging elements in heavy compacted soil or thick duff layer conditions.

SUMMARY OF THE INVENTION

According to one aspect of the invention, there is provided a spot mounder apparatus comprising a digging blade frame, a digging blade pivotally connected to said digging blade frame, connection means operatively connected between said digging blade frame and a support frame for raising and lowering said digging blade frame and means to rotate said digging blade relative to said digging blade frame.

Further according to the invention, there is provided a spot mounder apparatus comprising a digging blade pivotally connected to a shank, said shank being connected to a digging blade frame, means for pivotally connecting said digging blade frame and a support frame, said connection means being operable to raise and lower said digging blade and said shank, means for rotating said digging blade relative to said shank and said connection means, a hydraulically operated latch operably interposed between said digging blade and said shank for intermittently retaining and releasing said digging blade relative to said shank, said shank and said digging blade frame being vertically movable with said connection means during operation of said digging blade.

Also according to the invention, there is provided a spot mounder apparatus comprising a digging blade pivotally connected to a shank, said shank being connected to a digging blade frame, means for pivotally connecting said digging blade frame and a support frame, said connection means being operable to raise and lower said digging blade and said shank, means for rotating said digging blade relative to said shank and said connection means, a hydraulically operated linkage means interposed between said digging blade and said digging blade frame for intermittently retaining and releasing said digging blade relative to said shank, said shank and said digging blade frame being vertically movable with said connection means during operation of said digging blade.

According to another aspect of the invention, there is provided a method of constructing mounds from earth comprising the steps of inserting the teeth of a digging blade assembly connected to a digging blade frame in a first position into the ground at a predetermined time and location, applying downwards force to said digging blade frame while maintaining said digging blade in a fixed position relative to said digging blade frame, releasing and rotating said digging blade to a second position relative to said digging blade frame while raising said digging blade frame and rotating said digging blade from said second to said first position. Releasing said digging blade may comprise hydraulically releasing a latch mechanism constraining said digging blade or it may comprise releasing a linkage means constraining said digging blade.

BRIEF DESCRIPTION OF THE SEVERAL VIEWS OF THE DRAWINGS

Specific embodiments of the invention will now be described, by way of examples only, with reference to the drawings, in which.

DESCRIPTION OF SPECIFIC EMBODIMENT

Figure 1A:
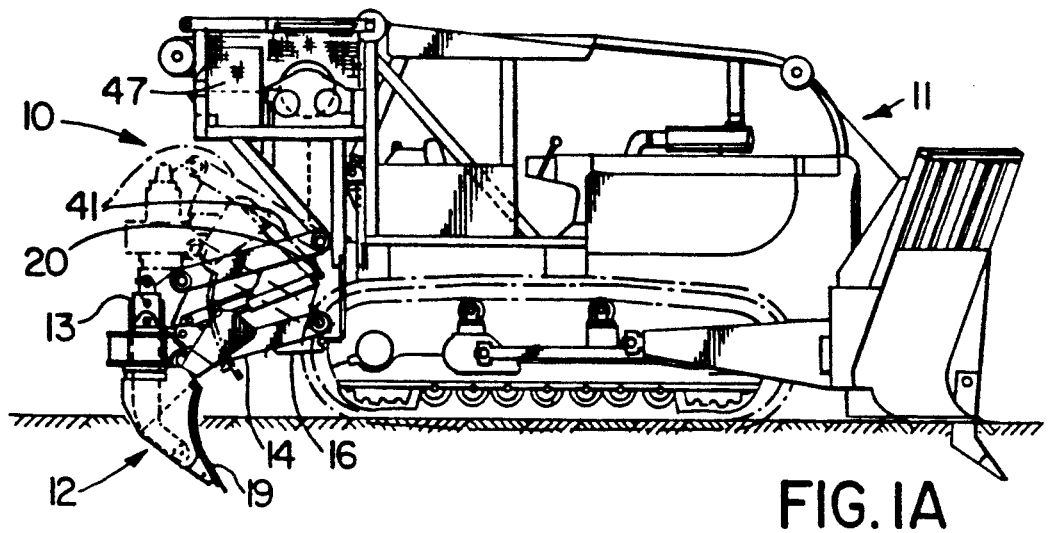
FIG. 1A is a side view of a crawler with the spot mounder apparatus according to the invention connected to the back end of the crawler in a lowered position.
Figure 1B:
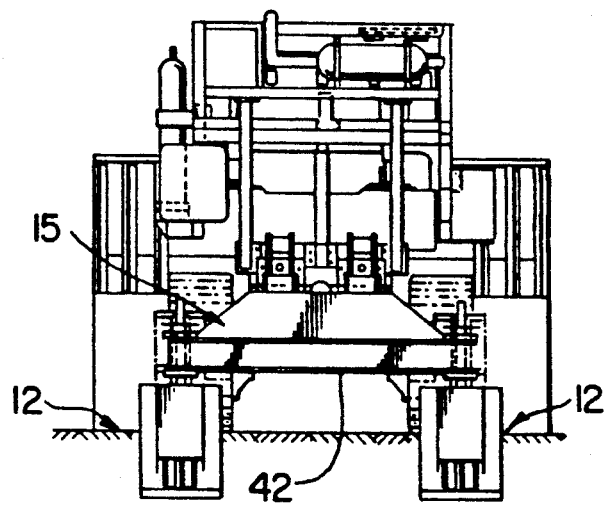
FIG. 1B is a rear view of the crawler and spot mounder apparatus of FIG. 1A.
Figure 1C:
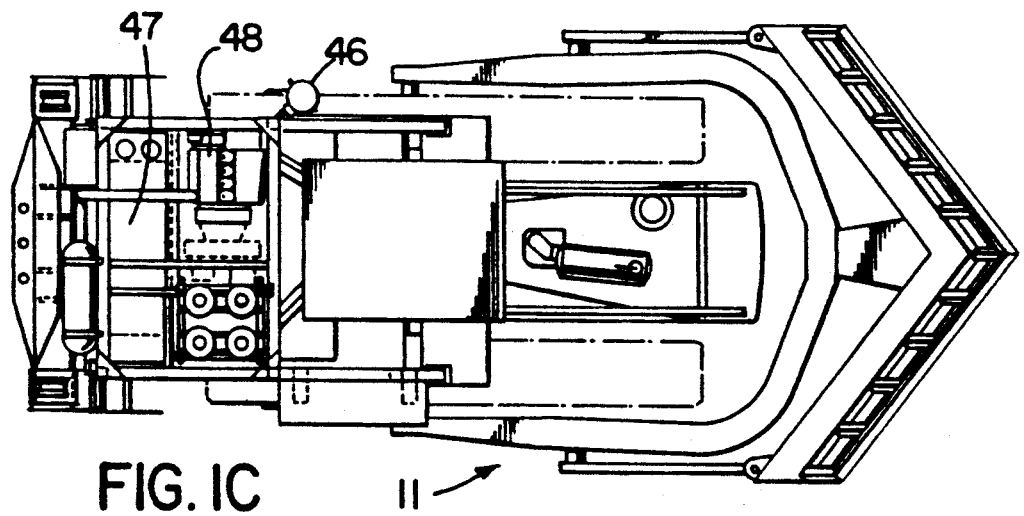
FIG. 1C is a plan view of the crawler and spot mounder apparatus of FIG. 1A.

Reference is now made to the drawings and, in particular, to FIG. 1 where a spot mounder apparatus is generally illustrated at 10 as being attached to the rearward end of a prime mover such as a crawler tractor generally illustrated at 11. The spot mounder 10 includes two digging blade assemblies generally illustrated at 12. As seen in FIG. 1B, two digging blade assemblies 12 are connected to the spot mounder 10 which is connected to the back end of the crawler tractor 11. The digging blade assemblies 12 are connected together with a transverse cross beam 42, the assembly being generally referred to as the ripper assembly or scoop arm assembly generally illustrated at 15. For the purpose of the subsequent description, only one digging blade assembly 12 will be described, it being understood that the oppositely located digging blade assembly 12 of the ripper assembly 15 is a mirror image and will operate in a virtually identical manner.

The digging blade assembly 12 comprises a digging blade or scoop 19 operatively and rotatably connected to a digging blade frame 13. A connection in the form of a four bar linkage 14 extends between the ripper assembly 15 and a back or support frame 20 which is rigidly connected to the rearward end of the crawler tractor 11. Mechanical stops 16 are connected to the back support frame 20 and are adapted to contact the ripper assembly 15 when the ripper assembly is in its lowermost and uppermost positions so as to restrain further movement beyond these two positions.

Figure 2A:
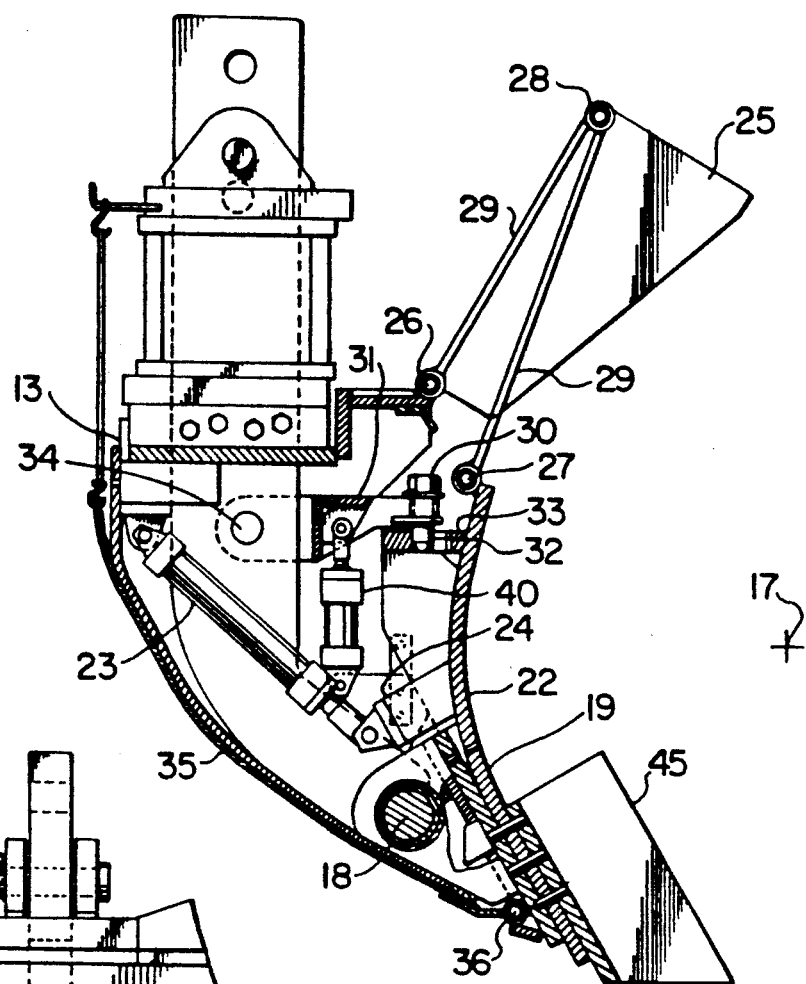
FIG. 2A is an enlarged partial section side view of the digging blade or scoop and digging blade frame of the spot mounder apparatus.
Figure 2B:
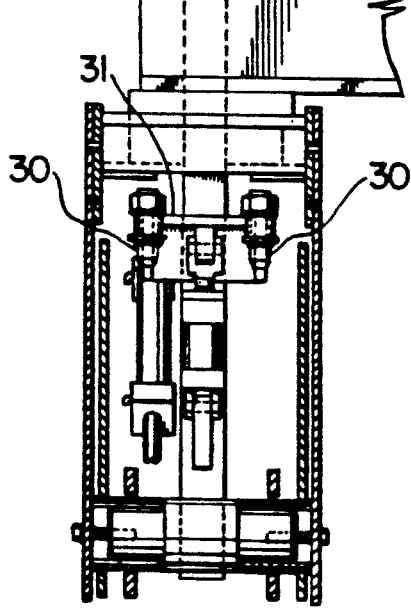
FIG. 2B is a rear view of the digging blade and digging blade frame of FIG. 2A.

With reference to FIGS. 2A and 2B, the digging blade 19 has a concave forward surface 22 and is pivotally mounted about axis 18 on digging blade frame 13. The shape of the concave surface 22 of the digging blade 19 is important to properly form the mounds. Reference is made to FIG. 2A where the centre 17 of the radius of curvature is given. A radius of approximately 24" for the curvature of the digging blade 19 has been found satisfactory. A hydraulic or flip cylinder 23 is pivotally connected between the digging blade 19 and the digging blade frame 13. It extends to pivotally join an arm 24 which is rigidly connected to the digging blade 12.

Two latch pins 30 are retained in a latch pin arm 31 which extends from and is pivotally mounted to the digging blade frame 13 at axis 34. Complementary recesses 32 in recess arms 33 are adapted to mate with the ends of the latch pins 30 when the digging blade 19 is in its initial non rotated position as described in more detail hereafter and as illustrated in FIG. 2A. The latch pin arm 31 is rotated about axis 34 with hydraulic or latch cylinder 40 also as described in more detail hereafter.

A mudflap 25 to protect the working mechanisms inside the digging blade assembly 12 when it is in the rotated position is connected between the digging blade frame 13 and the digging blade 19 by pins 26, 27, 28 which are mounted in plastic self-lubricating bushings. A rear mudguard 35 for a similar function at the back of the digging blade 19 is connected between the digging blade frame 13 and a pin 36 located on the bottom of the digging blade 19.

With reference again to FIG. 1A, two hydraulic ripper cylinders 41 are connected between the four bar linkage 14 of the ripper assembly 15 and the back or support frame 20. Hydraulic ripper cylinders 41 are used to lift and lower the ripper assembly 15 and the two attached digging blade assemblies 12 relative to the back support frame 20 and the crawler 11, between the two positions illustrated in FIG. 1A, the upper position of the ripper assembly 15 being the retracted position of the spot mounder 10 and the lower position being the operating position of the spot mounder 10. It will be understood cylinders 41 can apply substantial downward force to the ripper assembly 15 so as to force the assembly 15 and its associated digging blade assemblies 12 into even hard and compacted soil.

Two side plates 45 are mounted to the forward edge of the digging blade 19. The sideplates 45 act to retain the soil which is removed by the action of the digging blade 19. The sideplate 45 rotates with the digging blade 19 when in operation.

The spot mounder apparatus 10 is self-powered by an engine 48 mounted in the upper portion of the spot mounder 10. A hydraulic circuit is used to provide power to the operating components of the spot mounder 10 and includes an accumulator 46 and a hydraulic fluid reservoir 47 mounted adjacent engine 48. The hydraulic circuit operation is initiated by computer control which allows the operator to determine the operation commencement time.

Figure 5:
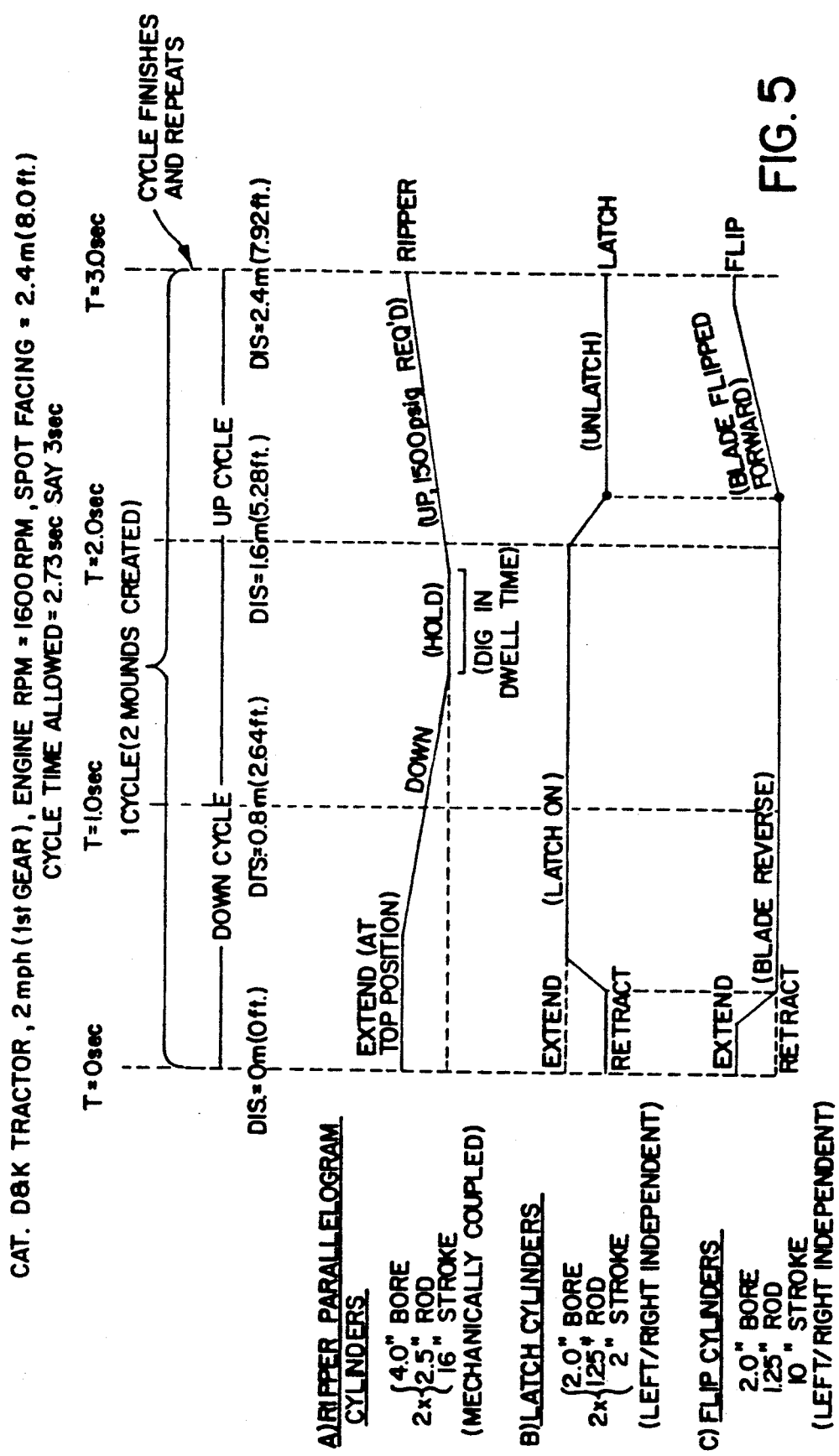
FIG. 5 illustrates the time actuation chart for various of the operating cylinder elements of the hydraulic circuit.

A schematic of the hydraulic circuit is seen in FIG. 4. The principle elements include a control valve 55 which initiates the operating sequence of the flip, latch and ripper cylinders 23, 40, 41, respectively, as seen in FIG. 5. The upper, middle and bottom bar graphs illustrate the operating sequence of the flip, latch and ripper cylinders 23, 40, 41, respectively, and the operation of the cylinders will be described in greater detail hereafter.

In operation, it will be assumed that the crawler 11 is moving forwardly or to the right as viewed in FIG. 1A and that the ripper assembly 15 with its connected digging blade assemblies 12 is in the raised or lifted position illustrated in FIG. 1A. The engine 48 will be operating and the accumulator 46 in the hydraulic system will have been brought to the correct pressure.

The operation is initiated by the operator engaging the computer controlled electrical system (not illustrated) which initiates operation of the hydraulically activated circuitries (FIG. 5) by a timer. The timer will initiate the operating sequence of the ripper, latch and flip cylinders 41, 40, 23, respectively, according to the sequence illustrated in FIG. 5. Initially, as viewed in FIG. 5, the ripper cylinders 41 will lower the digging blade assemblies 12 and the digging blades 19 and, in so doing, the "duff layer 43" and the mineral soil layer 44 of the soil are penetrated as illustrated in FIG. 3 until the proper operating depth or lowermost position is reached for the digging blade assemblies 12 as viewed in FIG. 1A. The side plates 45 (FIG. 2A) are lowered with the digging blades 19 and keep a substantial portion of the soil displaced forward of the digging blade 19 as the ground is entered. The mudflap 25 will be in the position as illustrated in FIG. 2A at this time. The latch cylinders 40 will maintain the digging blade 19 in position and are required to counteract the large force applied on the digging blade 19 which tends to rotate the blade 19 in a clockwise position about axis 18.

Figure 3A:
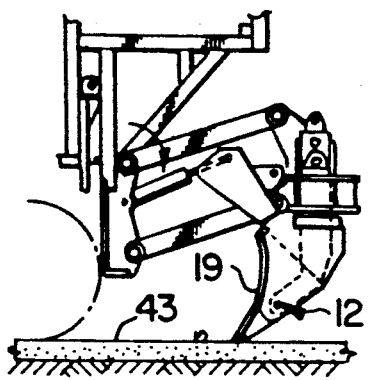
FIGS. 3A–3J are side views illustrating diagrammatically the sequential operation of the spot mounder apparatus.
Figure 3B:
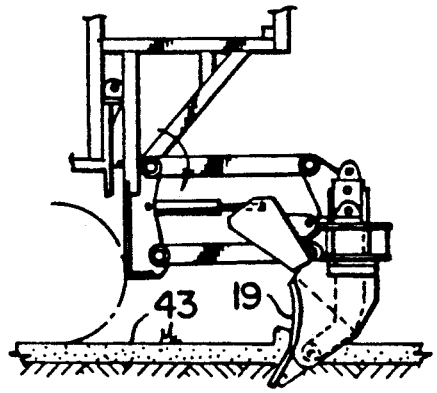
Figure 3C:
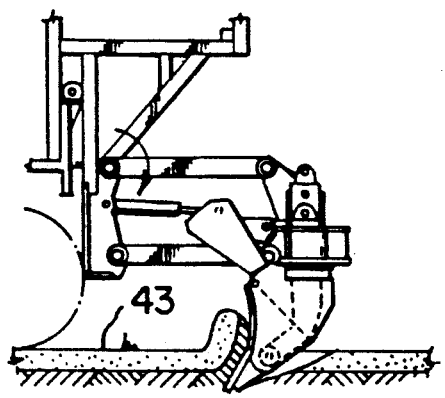
Figure 3D:
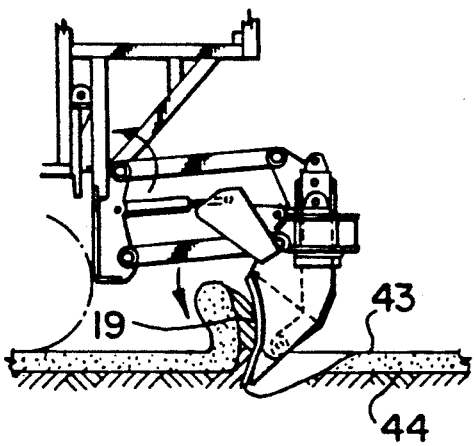
Figure 3E:
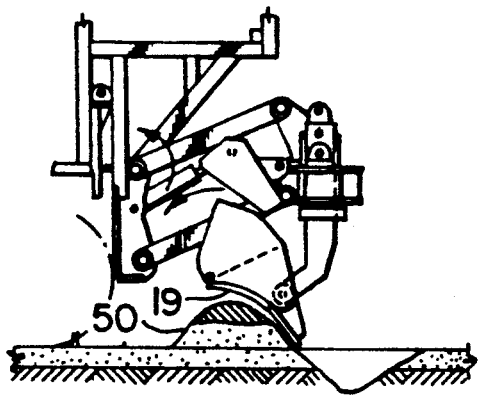

As the digging blade 19 enters the soil, the duff layer 43 initially and the mineral soil layer 44 thereafter, will move upwardly on the concave forward surface 22 of the digging blade 19 as seen in FIGS. 3B and 3C until the soil is turned over as best seen in FIGS. 3D and 3E and a mound 50 is formed from the soil with the duff layer 43 on the bottom and the mineral soil layer 44 on the top of the mound 50.

In accordance with the sequence chart of FIG. 5, and as the soil moves upwardly on the concave forward surface 22 of the digging blade 19, the automatic control system will initiate withdrawal of the ripper assembly 15 and digging blade assemblies 12 by activating the ripper cylinders 41. As the ripper assembly 15 is withdrawn from the ground, the latch cylinders 40 will be activated to rotate the latch pin arm 31 counter clockwise as viewed in FIG. 2A and to therefore remove the pins 30 from the complimentary recesses 32 on the recess arms 33.

Figure 3F:
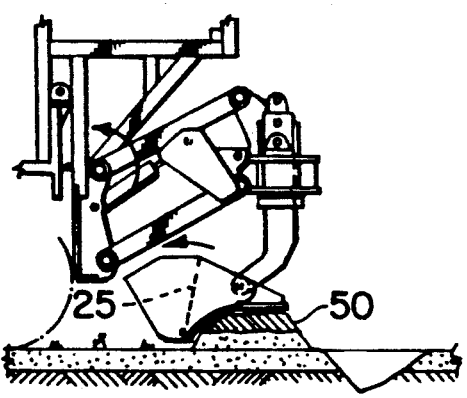

When the latch pin arm 31 is rotated to an extent such that the pins 30 are removed from recesses 32 and the digging blade 19 is therefore unlatched, the flip cylinder 23 will extend and rotate the digging blade 19 clockwise as seen in FIG. 2A about pivot axis 18 as seen in FIGS. 3D-3F. The movement of the flip cylinder 23 will assist in forming the mound 50. When the mound 50 is fully formed, the digging blade 19 will have assumed the position illustrated in FIGS. 3E and 3F.

Figure 3G:
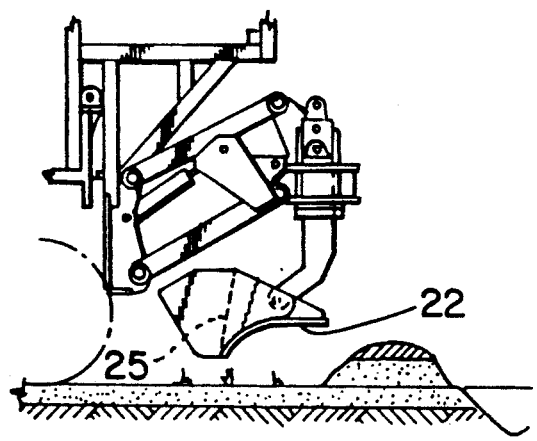
Figure 3H:
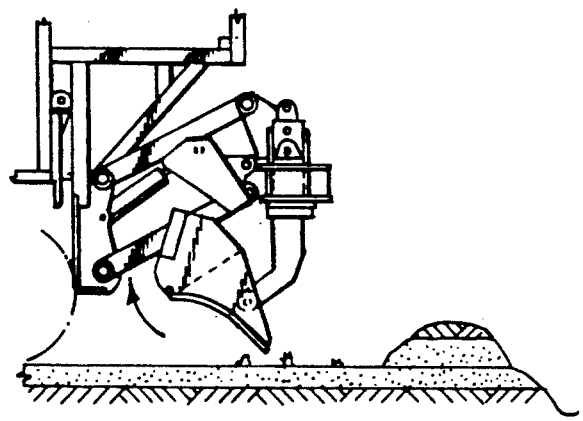

As the crawler 11 continues to move to the left as viewed in FIG. 3, the rotation of the digging blade 19 under the influence of hydraulic flip cylinder 23 will continue until the digging blade 19 clears the mound 50 as illustrated in FIG. 3G. Thereafter, the digging blade 19 is rotated clockwise under the influence of hydraulic flip cylinder 23 until the initial condition of the blade 19 is assumed as illustrated in FIG. 3I. The latch cylinder 40 reinsert the pins 30 in their recesses 32 whereupon the spot mounder 10 is then ready for a further operating sequence.

When the digging blade 19 is rotated under the influence of flip cylinder 23, the mudflap 25 will rotate with the digging blade 19 about pins 26, 27, 28 relative to the digging blade frame 13. The extended area of the mudflap 25 will close the side area of the digging blade assembly 12 as seen in FIG. 3F which is otherwise open to dirt and other contaminants. As well, the lateral or frontal area 29 of the mudflap 25 will close the frontal area of the digging blade assembly 12 for the same purpose.

The use of the latch pins 30 in association with the recess 32 on recess arm 33 have been found advantageous as described above. When the digging blade 19 initially contacts the ground surface, there is a tendency for the blade 19 to rotate due to the large longitudinal drag forces on the digging blade 19 in the ground. The use of the latch pins 30 on latch pin arm 31 which is under the control of hydraulic cylinder 40 tends to counteract such forces and to stabilize the digging blade 19 in the ground until rotation of the digging blade 19 by the automatic control system commences as illustrated in FIG. 3C and as earlier described.

Figure 3I:
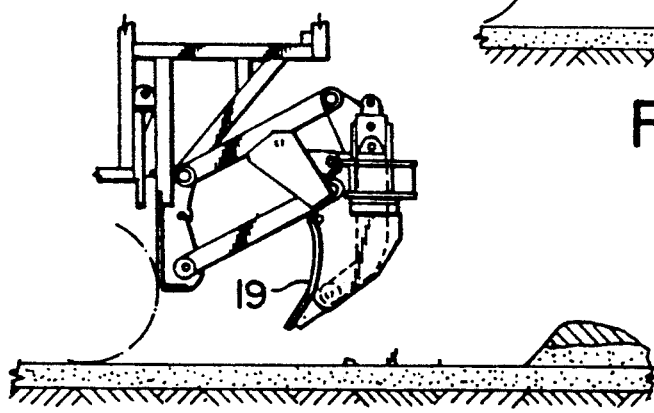
Figure 3J:
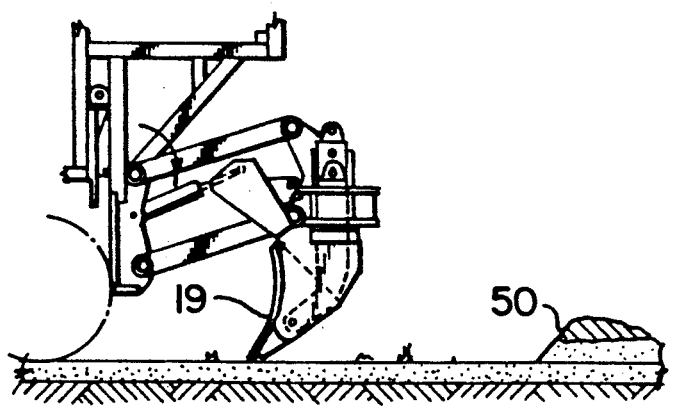
Figure 4A:
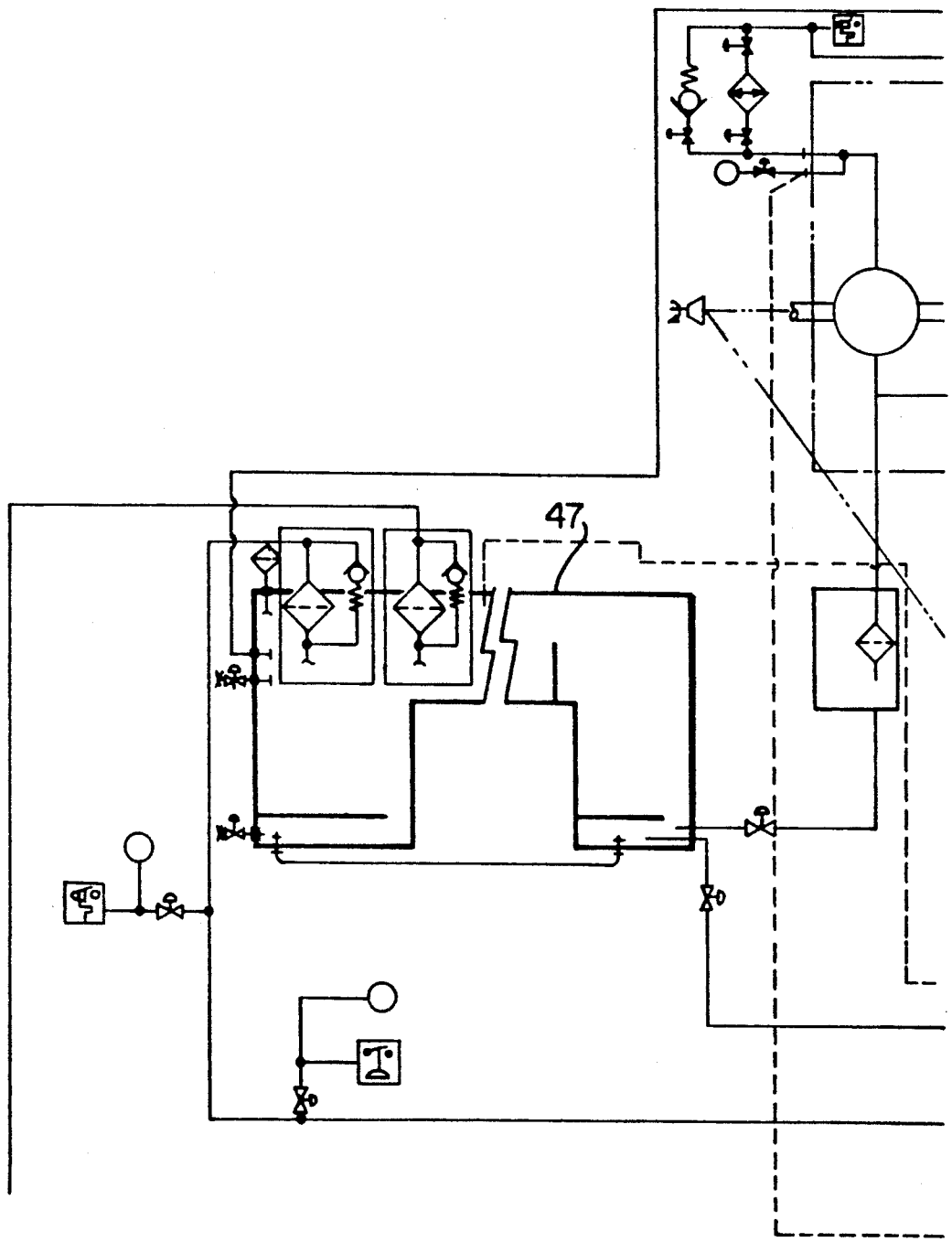
FIGS. 4A–4F are schematics which are joined together as illustrated in FIG. 4G.
Figure 4B:
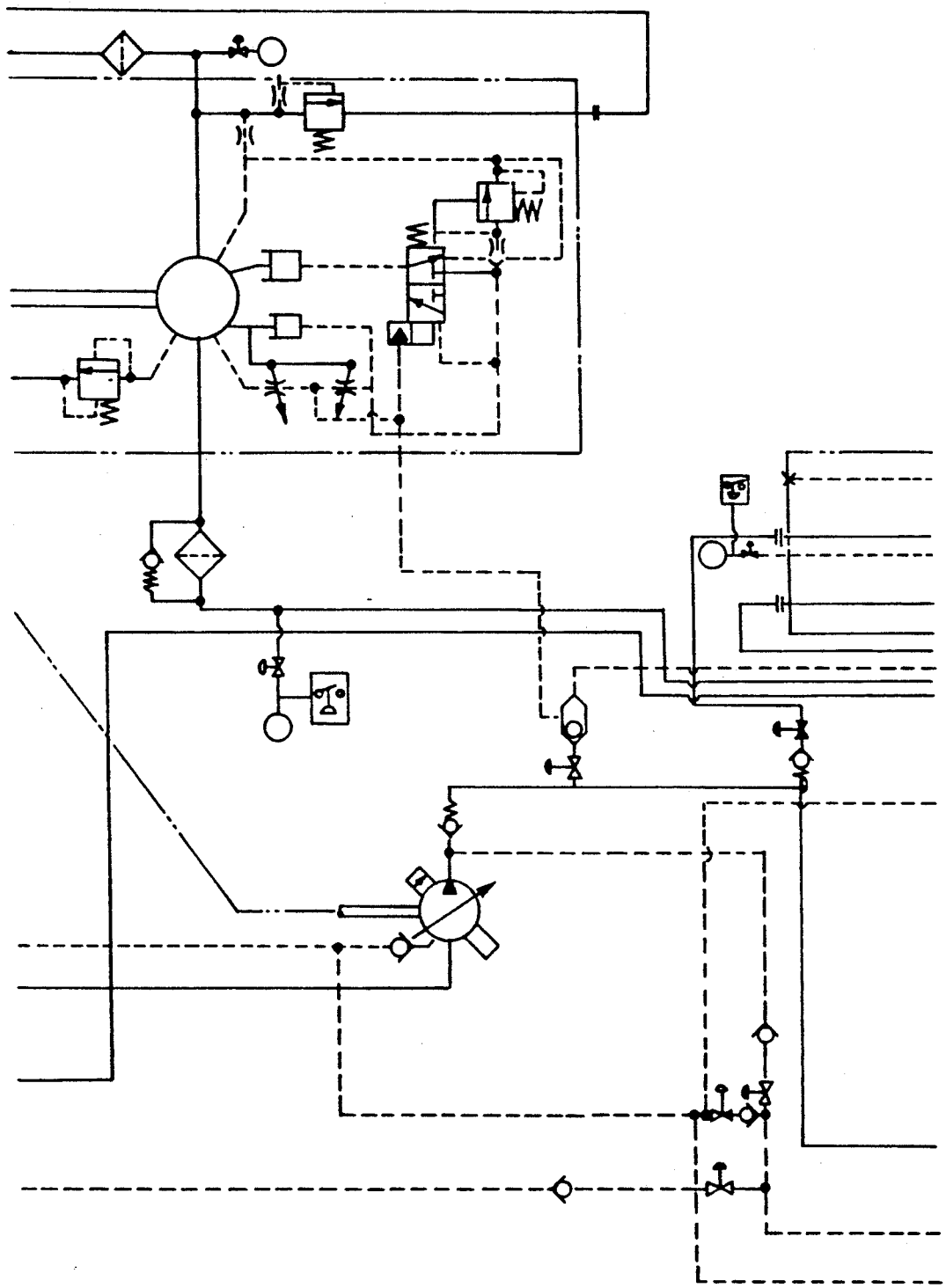
Figure 4C:
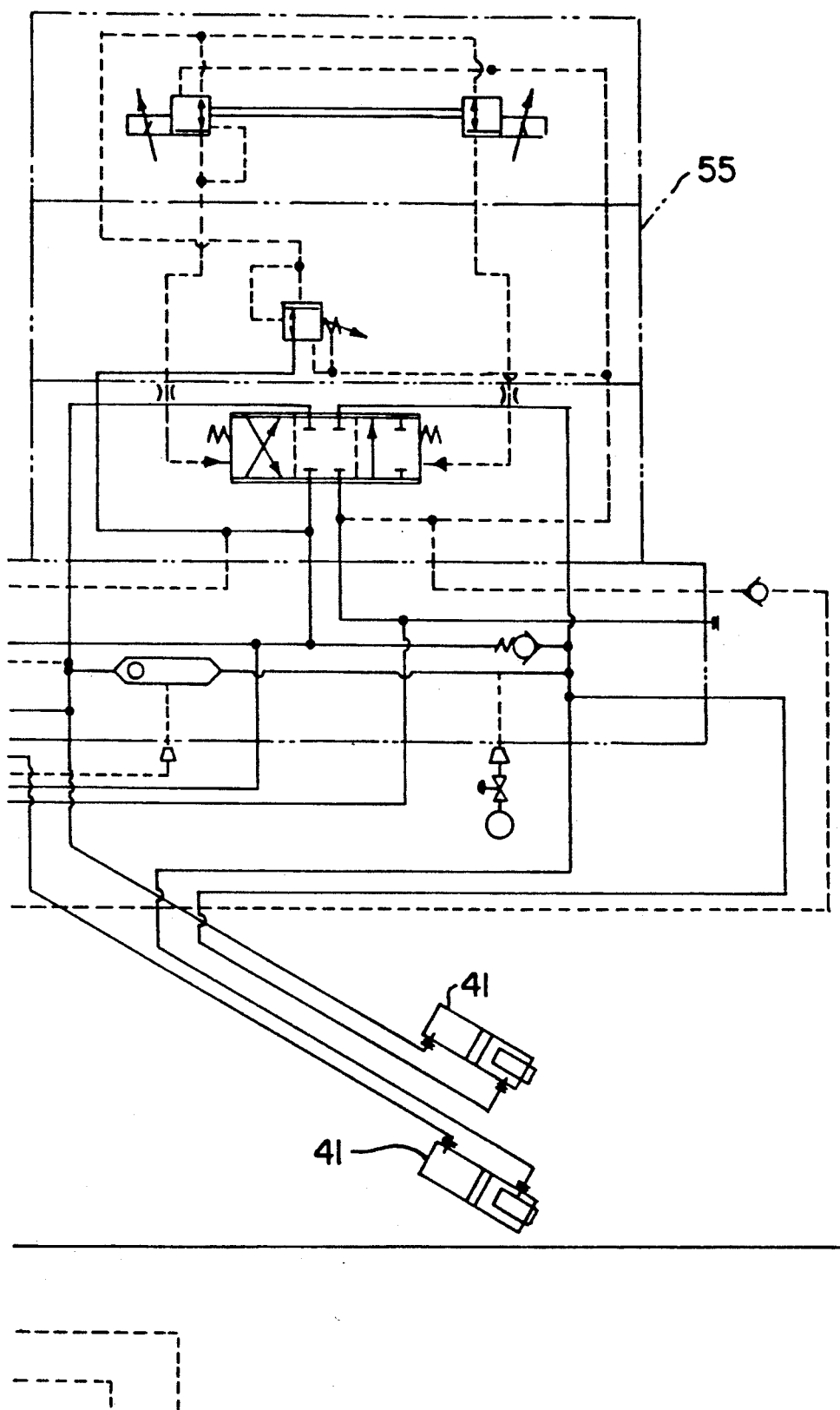
Figure 4D:
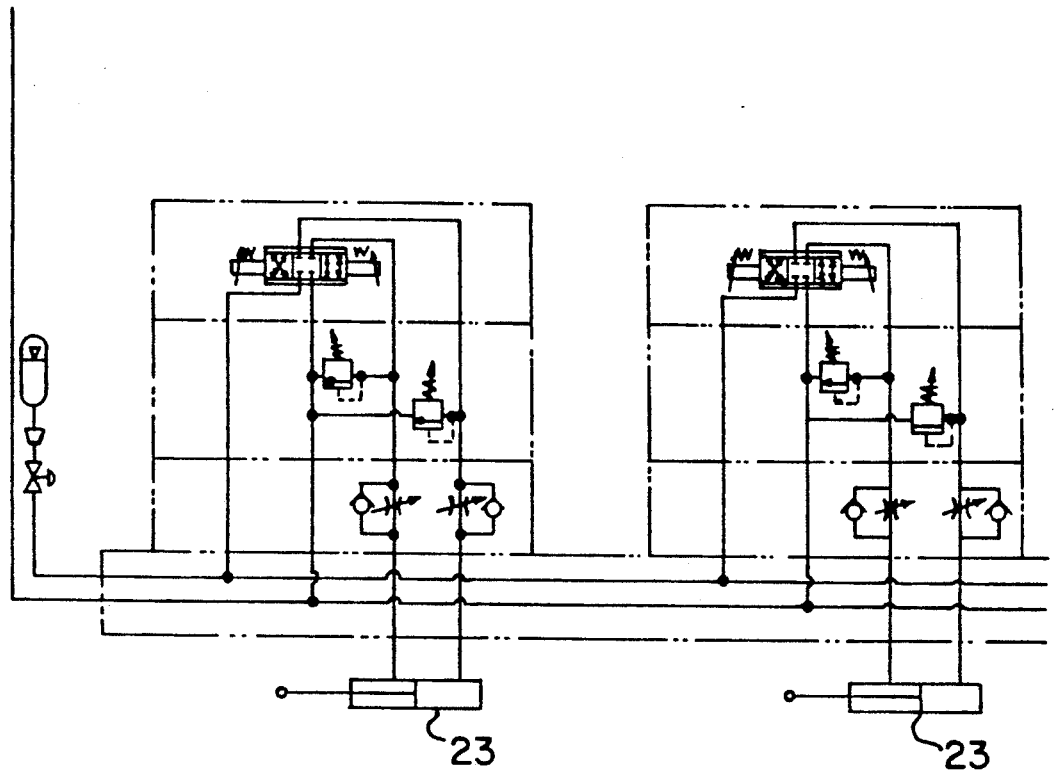
Figure 4E:
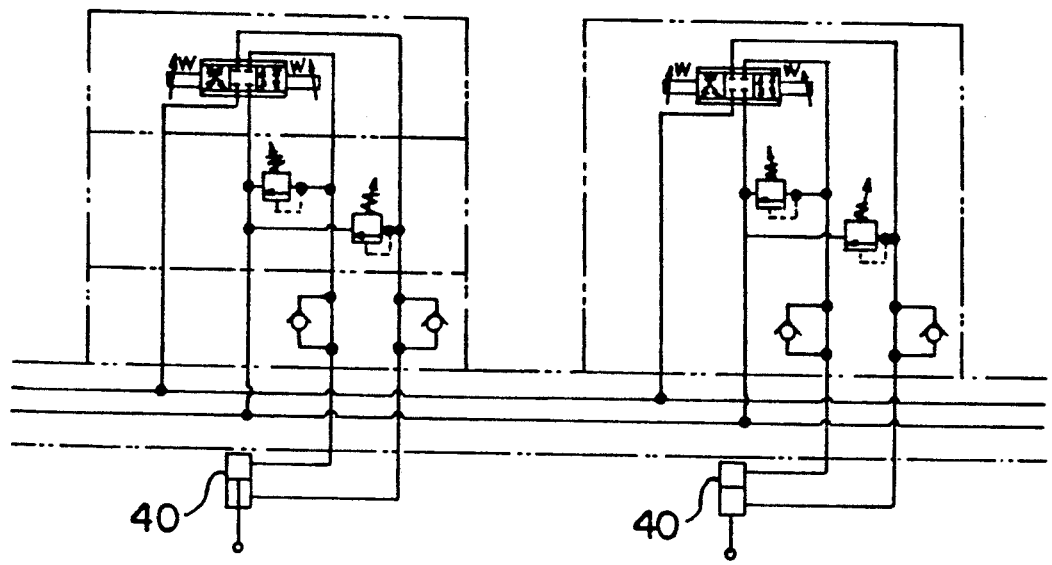
Figures 4F, 4G:
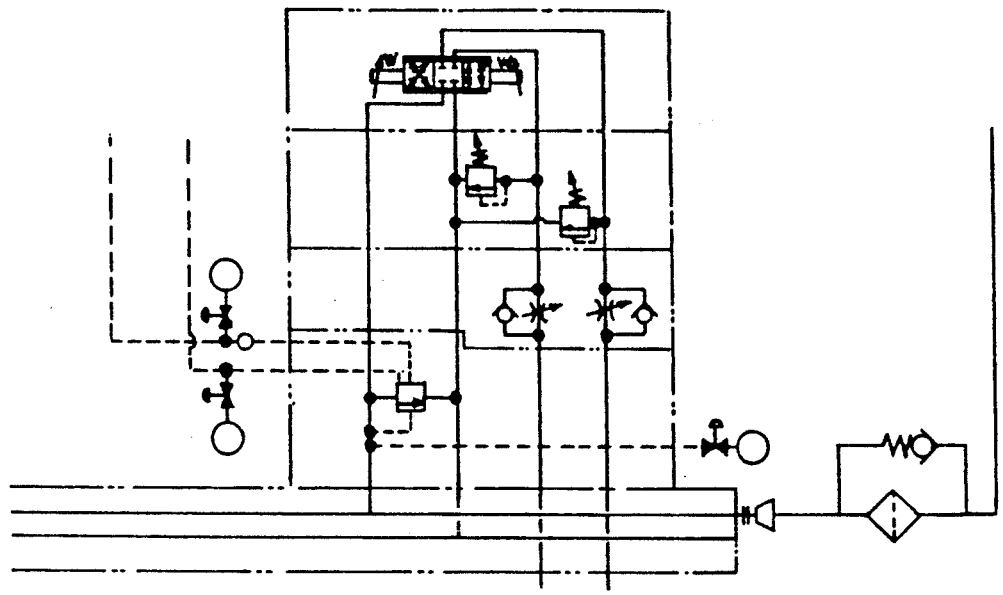

In operations to date, it has been found that a timed sequence of operations from the position of the digging blade 19 and digging blade frame 13 illustrated in FIG. 3A to the position of the digging blade 19 and digging blade frame 13 illustrated in FIG. 3J will satisfactorily be 5.0 seconds as indicated in FIG. 5 with a speed of the crawler 11 being 1.8 m.p.h. The engine of the crawler 11 at such a speed will typically have a speed of 2000 r.p.m.

A duff layer 43 typically has a thickness of 3" to 5" as seen in FIGS. 3B and 3C. In the fully lowered position as viewed in FIG. 1A, the digging blade 19 is intended to be fully 25" below the ground surface. When the digging blade 19 is rotated as seen in FIG. 3G, the distance from the uppermost concave surface 22 to the ground surface is contemplated to be 24". At the end of the sequence as seen in FIG. 3I, the digging blade 19 is located approximately 20" above the surface of the ground.

Other dimensions which are of interest are shown in FIG. 3J. As seen, the distance for one cycle from the point of ground penetration by the digging blade 19 to the commencement of a new cycle where ground penetration is again imminent is approximately 10'. A mound 50 is formed which is typically 14" high and which has a width of approximately 30".

Figure 6A:
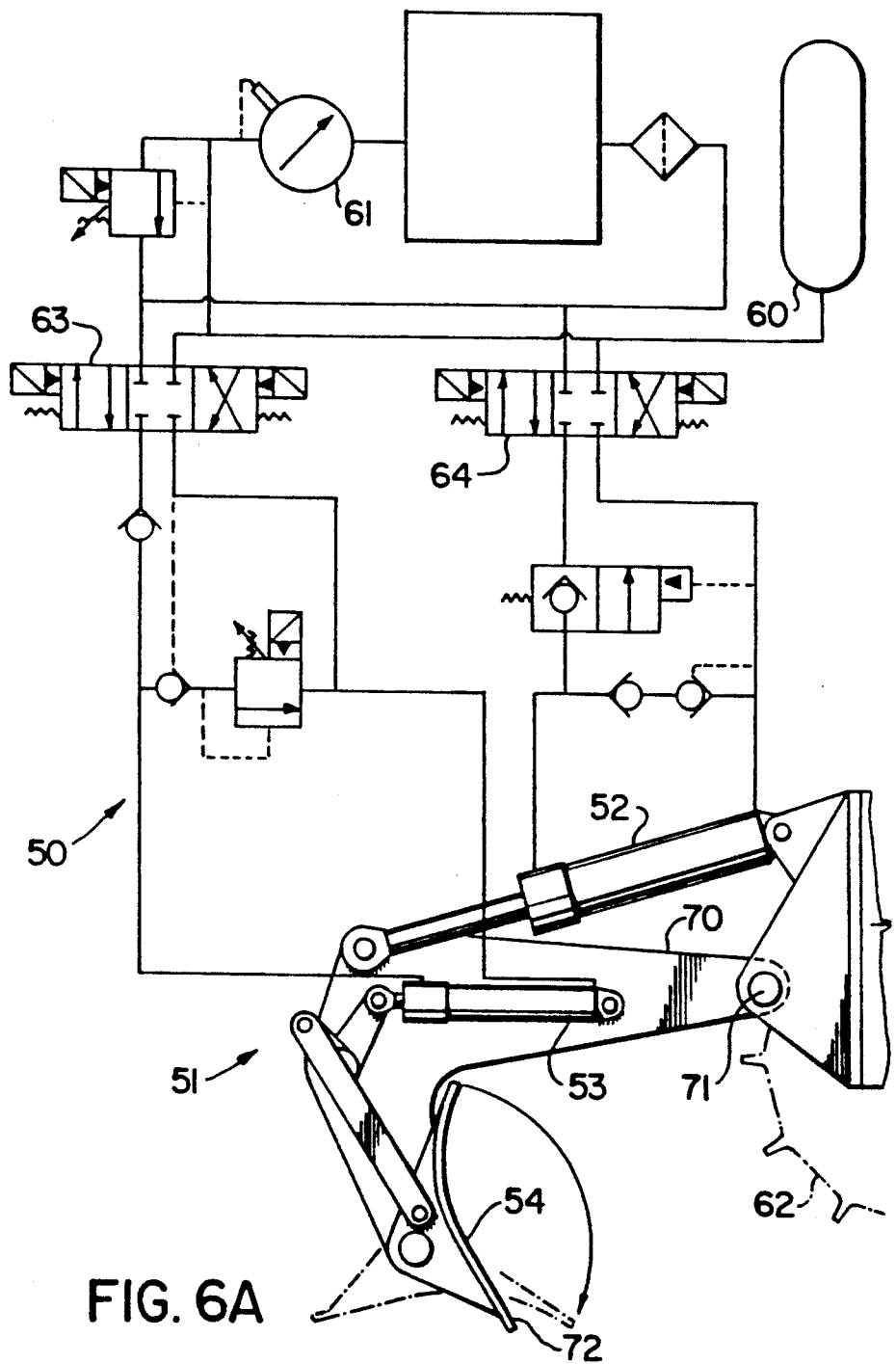
FIG. 6A is a diagrammatic side view of a further embodiment of the hydraulic system and spot mounder.
Figure 6B:
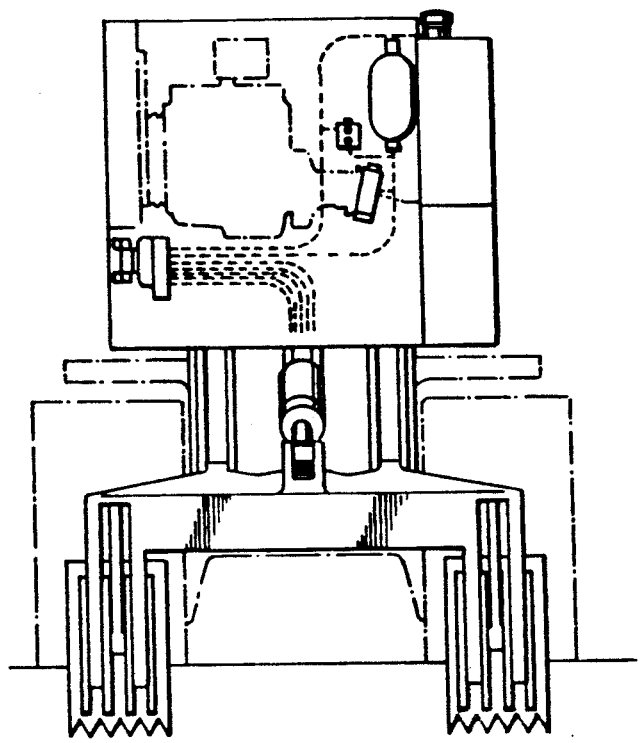
FIG. 6B is a diagrammatic rear view of the spot mounder of FIG. 6A.
Figure 6C:
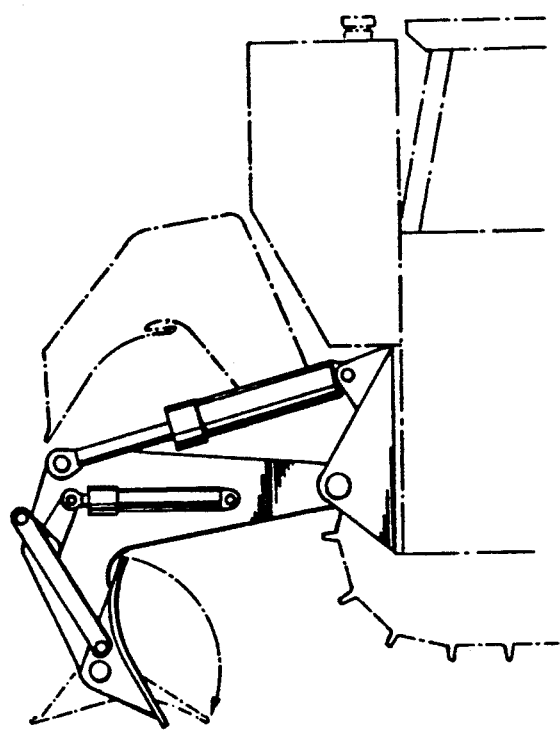
FIG. 6C is a view similar to FIG. 6A but illustrating the spot mounder connected to the rear of the crawler.

A further embodiment of the spot mounder apparatus is illustrated in FIG. 6. In this embodiment, the hydraulic system of FIG. 4 is replaced with the hydraulic circuit generally illustrated at 50 in FIG. 6A and the ripper assembly 15 of FIG. 1 is replaced with the ripper assembly generally illustrated at 51.

In this embodiment, there exists only three cylinders, namely one arm cylinder 52 and one scoop cylinder 53 for each digging blade 54. The latch cylinder 40 of the embodiment of FIG. 1 is eliminated. Similarly, the four bar linkage 14 is replaced by a link 70 which rotates about axis 71 under the influence of arm cylinder 52. It has also been found that replaceable teeth 72 (FIG. 6B) on the leading edge of each digging blade 54 are advantageous to reduce the force necessary to insert the digging blade 54 into the ground. Likewise, by the appropriate use of accumulator 60 in hydraulic circuit 50, it is intended to reduce the power requirements and, therefore, to eliminate the need for the independent engine 48 of the FIG. 1 embodiment or, at least, to reduce the power required from the independent engine 48, with the hydraulic pump 61 being driven from the engine of the crawler 62.

As seen in FIG. 6A, the scoop cylinder control valve 63 and the arm cylinder control valve 64 are solenoid controlled and under the influence of an automatic control system similar to the automatic control system of the FIG. 1 embodiment. In operation, the control valves 63, 64 are activated under the influence of a programmable computer which allows the operator to adapt the spot mounder apparatus to a variety of soil and site conditions as in the case with the embodiment of FIGS. 1 to 5. In accordance, therewith, the raising and lowering of the digging blade frame and the rotation of the digging blade 54 relative to the digging blade frame are programmed in the same way as the programming described and illustrated in connection with the FIG. 1 embodiment.

While the sequence of operations illustrated in FIG. 3 has been described as being time activated, the functions could also be sequenced from the power take off assembly on the prime mover or crawler 11.

Figure 7A:
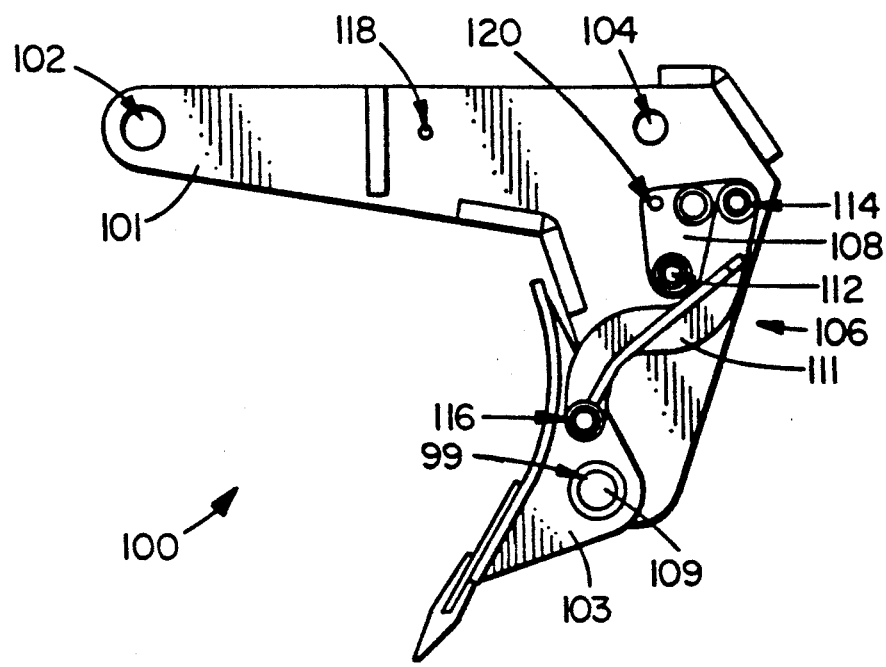
FIG. 7A is a side view of a digging blade or scoop arm assembly of a spot mounder according to yet another embodiment of the invention, showing the scoops or digging blades in a position which will be referred to as the "vertical position"
Figure 7B:
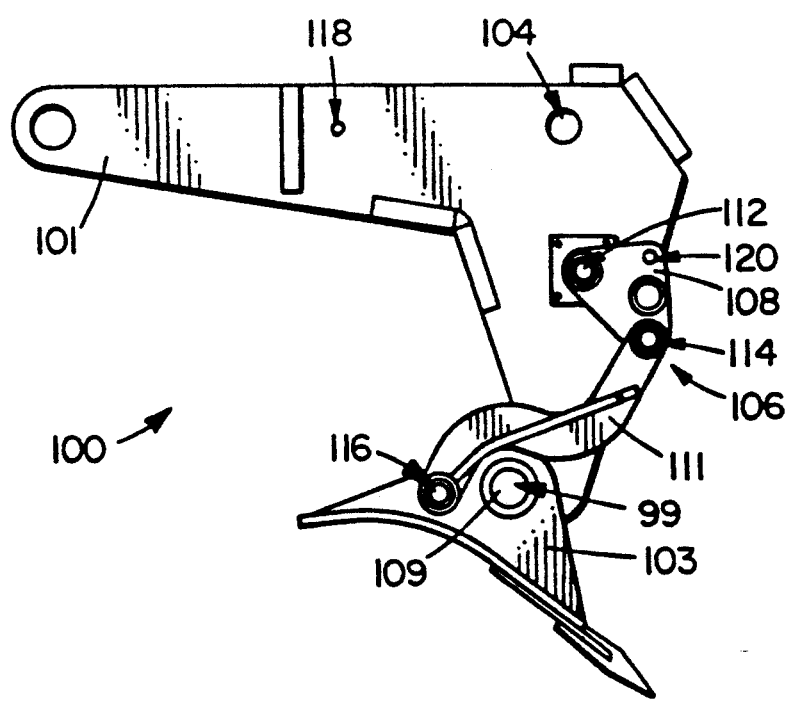
FIG. 7B is a view similar to that of FIG. 7A but showing the scoops in a position which will be referred to as the "horizontal position"
Figure 7C:
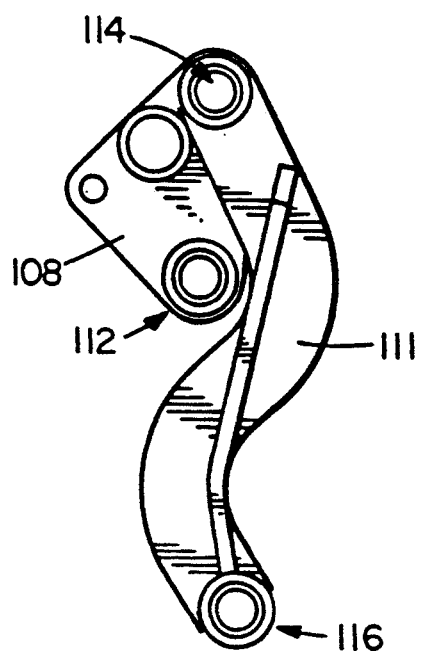
FIG. 7C is a side view of the scoop pivot linkage system of the scoop arm assembly of FIG. 7A.

With reference now to FIGS. 7A to 7D and FIG. 8, yet a further embodiment of a ripper assembly or scoop arm assembly according to the invention is shown. The scoop arm assembly is generally indicated at 100. It comprises a scoop arm 101 and scoops 103 mounted at the opposite ends thereof, by means of pivotal connections 99. The assembly 100 is attached to a crawler in a fashion similar to that shown in FIGS. 6B and 6C, i.e. by means of a pivotal connection 102 on the arm 101, as indicated in FIGS. 7A and 7B. A single arm cylinder 105 (FIG. 8) is connected between the body of the crawler and a pivotal connection 104 on the arm 101, for the purpose of raising and lowering the arm 101.

While the arm 101 is provided with two scoops 103, only one scoop 103 is shown in FIGS. 7A and 7B and the remaining description will refer to one scoop only, it being understood that the other scoop is identical and operates in the same fashion.

The scoop pivot linkage is generally indicated at 106. It comprises a triangular linkage member 108 and an S-shaped arm 111. The member 108 is pivotally connected to the main scoop arm 101 at 112. The S-shaped arm 111 and the member 108 are pivotally connected at 114. The arm 111 is pivotally connected to the scoop at 116. A scoop cylinder 107 (FIG. 8) is provided for operation between pivotal connections 118 and 120, on the arm 101 and the member 108, respectively. The scoop cylinder 107 operates to move the scoop 103 between the vertical position (shown in FIG. 7A) and the horizontal position (shown in FIG. 7B). The scoop cylinder 107 is in a retracted position when the scoop 103 is in the vertical position and in an extended position when the scoop 103 is in the horizontal position.

Figure 7D:
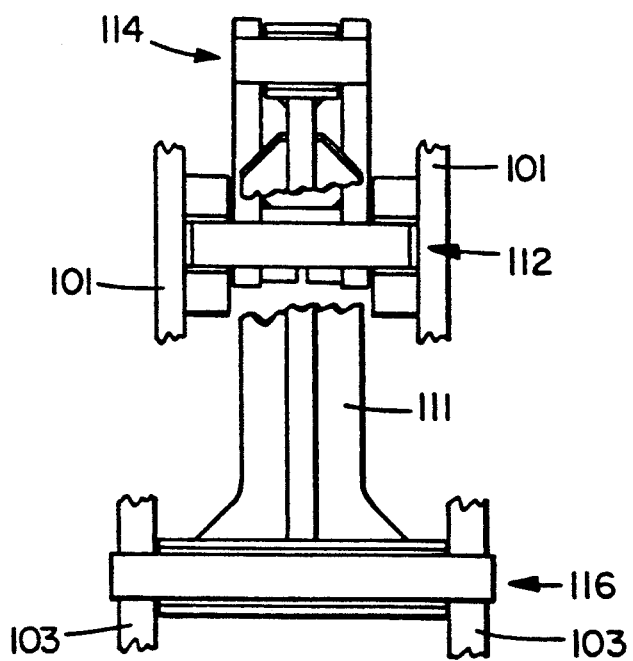
FIG. 7D is a fractional plan view of the scoop pivot linkage system of FIG. 7C, showing the pivotal connections thereof.

As can be seen from FIG. 7D, the scoop arm 101 comprises two spaced parallel members with the scoop pivot linkage 106 located in between, thus essentially forming a digging blade frame to which the digging blade or scoop 103 is pivotally connected at the pivotal connection 99 through a shank 109.

Figure 8:
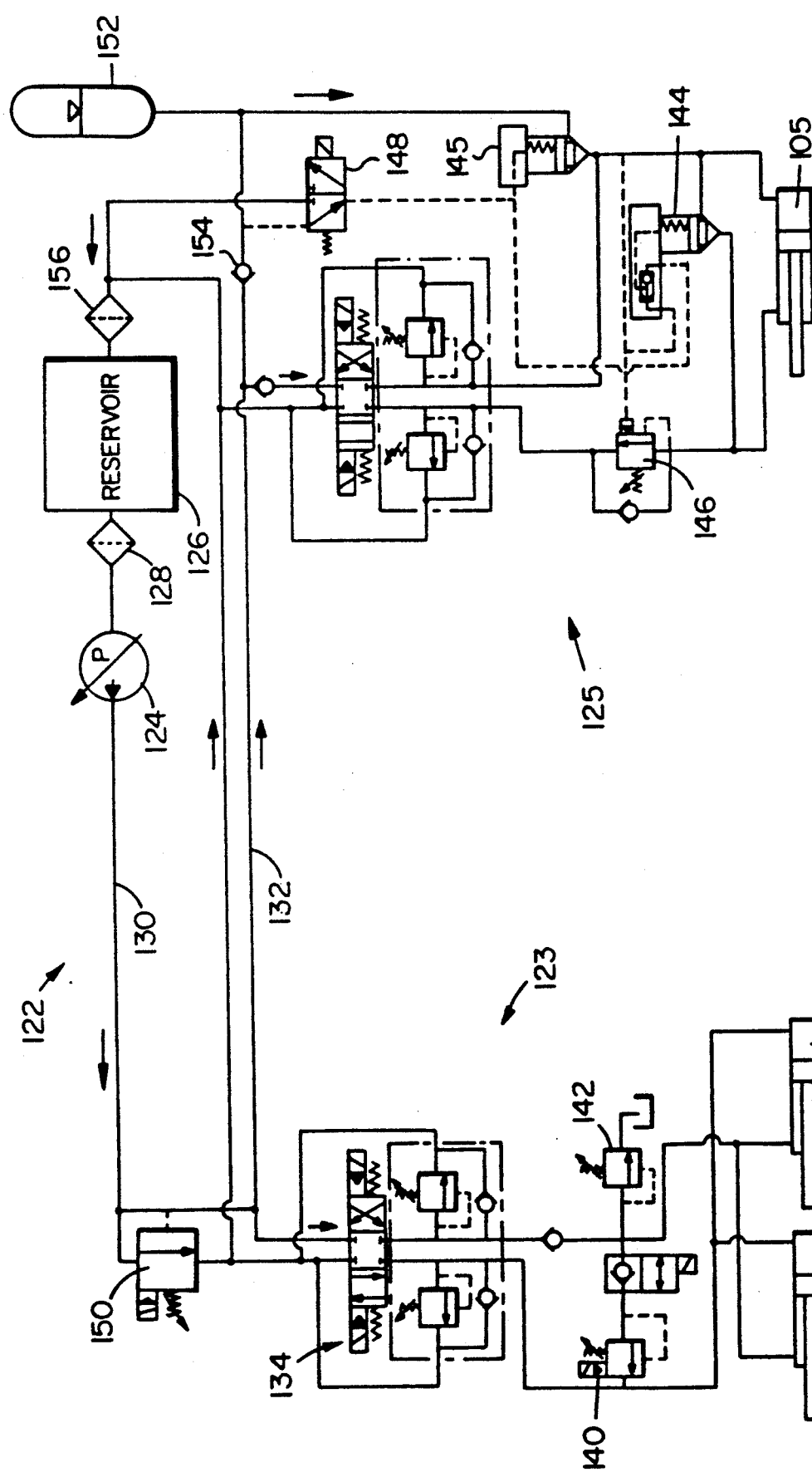
FIG. 8 is a diagram of the hydraulic system of the scoop arm assembly of FIG. 7A.

The assembly 100 performs basically the same sequence of operations illustrated in FIG. 3, by means of a hydraulic system 122, which is illustrated in FIG. 8. The hydraulic system comprises two main parts, i.e. the scoop system, generally indicated at 123, which controls the operation of the scoops 103, and the arm cylinder system, generally indicated at 125, for raising and lowering the arm 101.

The hydraulic system 122 has a hydraulic pump 124 which is connected to a hydraulic fluid reservoir 126 through a strainer 128. The pump 124 delivers hydraulic fluid through lines 130 and 132 to the scoop cylinders 107 and the arm cylinder 105, under the control of a scoop cylinder control valve 134 and an arm cylinder control valve 136, respectively. A solenoid valve 138 and a first relief valve 140 and a second relief valve 142 are provided in the scoop system 123.

In the arm cylinder system 125, there is provided a first poppet valve 144, a second poppet valve 145, a counterbalance valve 146, and a solenoid valve 148.

Also included in the hydraulic system 122 are a relief valve 150, an accumulator 152, a check valve 154 and a filter 156.

The hydraulic system 122 controls the arm cylinder 105 for raising and lowering the scoops 103 and the two cylinders 107 for rotating the scoops 103. The operation can be programmed in the same way as the programming described in respect of the FIG. 6A embodiment.

In operation, the scoops 103 are held vertically (FIG. 7A) as they penetrate the ground and plough a trench as the crawler moves forward. The cylinders 107 lock the scoops 103 in the vertical position for their entry into the ground. In this position, as shown in FIG. 7A, the pivotal connections 114, 112 and 116 do not all lie on a straight line, otherwise it would effectively require an infinite force against the scoop 103 to make it yield at the end of the digging operation. Instead the pivotal connections are slightly offset from a straight line arrangement and this offset, together with the setting of the relief valve 140, determines the force required on the scoop 103 to make it yield. When locking the scoops 103 in the vertical position, the control valve 134 is in the neutral position, which is the closed-centre position, so that the valve 134 blocks oil from either end of the scoop cylinders 107, thus locking the scoops 103 in the vertical position.

At the end of the trench digging operation, the scoops 103 are allowed to yield to the force of material accumulated during the trenching. This is the beginning of the mound forming phase. To achieve this, the two-position solenoid valve 138 is opened while the scoop cylinder control valve 134 shifts to the left, allowing oil to flow from the pump 124 to the blind end of the scoop cylinders 107. Oil from the rod end flows over the relief valve 140 to the blind end of the scoop cylinders 107. The resistance to the yielding of the scoops 103 is determined by the setting on the relief valve 140. As the scoops 103 yield, they are raised out of the trench by the arm cylinder 105 while the dirt, displaced from the trench, is rolled up onto the ground at the end of the trench to form the mound.

As the partially rotated scoops 103 clear the trench, they are flipped to the horizontal position (FIG. 7B) by the scoop cylinders 107 and pass over the top of the mound. To achieve this, the scoop cylinder control valve 134 is shifted to the left. Oil flows to the blind end of the scoop cylinders 107 while the oil from the rod end flows through the solenoid valve 138 and relief valve 140 which is vented at the moment and augments the oil supply to the blind end. With oil passing from the rod end to the blind end, the scoop cylinders 107 are operating in a regenerative fashion which maximizes stroke speed with a minimum of flow from the pump 124.

The scoops 103 are flipped back to the vertical position as the arm 101 reaches the top of its travel. This is achieved by moving the scoop cylinder control valve 134 to the right to direct oil into the rod end and out of the blind end.

The arm cylinder 105 must be large enough to ensure good ground penetration in the last 20% of the downward travel of the scoops 103. The first 80% is a rapid free fall condition and the cylinder 105 provides very little force. However, the oil flow to the blind end of the cylinder 105 can be 50% to 75% greater than the pump's capacity. This difference is made up by a regenerative flow from the cylinder's rod end, which passes through the poppet valve 144 and augments the pump flow passing through the arm cylinder control valve 136, which is shifted to the right.

When the scoops 103 contact the ground, pressure builds up rapidly in the cylinder's blind end. This pressure is transmitted through the pilot lines to close the poppet valve 144 and open the counterbalance valve 146. The cylinder 105 is now out of the regenerative mode. Oil flow from the cylinder's rod end passes through the counterbalance valve 146 and back to the reservoir 126 through the arm cylinder control valve 136 while full pump pressure is applied to the blind end. The blind end pressure buildup also opens the poppet valve 145 which introduces more high pressure oil from the accumulator 152 and increases the penetration speed of the scoops 103.

When the scoops 103 reach the bottom of the descent, the penetration phase is complete and the arm cylinder control valve 136 moves to the neutral position. For a short time, while the scoops produce the trench, there is no other demand on the pump 124 and its flow is used to replenish the accumulator 152 through the check valve 154.

To retract the scoops 103, the arm cylinder control valve 136 is moved to the left. Oil flows through the check valve section of the counterbalance valve 146 to the cylinder's rod end. Oil from the blind end flows back to the reservoir 126 through the arm cylinder control valve 136. Both poppet valves are closed during the retraction phase. This is accomplished through the solenoid valve 148, which, up to this stage, has been energized. While the scoops 103 are retracted, the solenoid valve 148 is de-energized to introduce pilot pressure which closes both poppet valves.

To ensure that the pressures are maintained at a safe level, the scoop cylinder and arm cylinder direction control valves feature working port relief valves. Another relief valve 142 is located at the rod end of the scoop cylinder 107. The pump discharge pressure is limited by the relief valve 150. Oil cleanliness is maintained by the filter 156 and the strainer 128.

Many further modifications will occur beyond those described and contemplated to those skilled in the art, which modifications will fall within the scope of the invention. The embodiments described, therefore, should be considered as illustrative of the invention only and not as limiting its scope as defined in accordance with the accompanying claims.

What is claimed is:

1. Spot mounder apparatus comprising a digging blade pivotally connected to a digging blade frame, said digging blade frame being pivotally connected to a support frame, a first hydraulic cylinder between said digging blade frame and said support frame, said digging blade being simultaneously raised and lowered about said pivotal connection between said digging blade frame and said support frame by said first hydraulic cylinder, a link member pivotally connected at an off-center position to said digging blade frame and a link arm pivotally connected at one end to said link member and pivotally connected to at its other end to the digging blade, and a second hydraulic cylinder operatively connected between the digging blade frame and said link member.

2. A method of constructing mounds from earth comprising the steps of inserting a digging blade connected to a digging blade frame in a first position into the ground at a predetermined time and location by simultaneously rotating said digging blade, said digging blade frame and a connecting linkage between said digging blade and said digging blade frame about a first pivotal connection between said digging blade frame and said support frame, applying downwards force to said digging blade frame while maintaining said digging blade in said first position relative to said digging blade frame, releasing said connecting linkage between said digging blade and said digging blade frame which constrains said digging blade in said first position such that a link member of said connecting linkage rotates around an off center position and moves a link arm pivotally connected at one end to said link member and at the opposite end to said digging blade, rotating said digging blade to a second position relative to said digging blade frame by said movement of said link arm while raising said digging blade frame and said connecting linkage and rotating said digging blade from said second to said first position by reverse movement of said link arm and said link member.

3. Spot mounder apparatus as in claim 1, wherein said pivotal connection of the link arm to the digging blade and said pivotal connection of the link arm to the link member and said pivotal connection of the link member to the digging blade frame are approximately arranged in a straight line when the digging blade is being retained by said hydraulically operated linkage means.

4. Spot mounder apparatus as in claim 3, wherein said pivotal connection means comprises a shaft about which the digging blade frame is pivotal and a second hydraulic cylinder operatively connected between said support frame and said digging blade frame.

5. Apparatus as in claim 4, further comprising hydraulic circuit means operatively connected to said first and second hydraulic cylinders.

6. Apparatus as in claim 5, wherein said hydraulic circuit means includes hydraulic control valve means for controlling the operation of said first and second hydraulic cylinders.

7. Apparatus as in claim 6, wherein said control valve means is operatively connected to a programmable computer in a predetermined sequential operation.

8. Apparatus as in claim 7, wherein said spot mounder is operatively mounted on a prime mover, said hydraulic circuit having independent power means to power said hydraulic circuit.

9. A method as in claim 2, wherein the movement of said digging blade frame, the releasing of said linkage means and the rotation of said digging blade are under the control of a programmable computer.

* * * * *